Patented Sept. 15, 1953

2,652,397

UNITED STATES PATENT OFFICE 2,652,397

SENSITIZING DYES CONTAINING A 2-ACYL-AMINO-5(4)-THIAZOLONE NUCLEUS

Per Aubert, Oslo, Norway, and Edward B. Knott, Harrow, England, assignors to Eastman Kodak Company, Rochester, N. Y., a corporation of New Jersey No Drawing. Application December 29, 1950, Serial No. 203,525

12 Claims. (Cl. 260—240.4)

This invention relates to merocyanine dyes containing a 2-acylamino-5(4)-thiazolone nucleus and to a method for preparing them.

Merocyanine dyes containing a 2-alkylthio- or 2-aralkylthio-5(4)-thiazolone nucleus have previously been described by Cook et al. See "Jour. Chem. Soc." (1949), page 1435. These dyes were suggested as useful intermediates in the synthesis of penicillin.

We have now prepared new merocyanine dyes containing a 2-acylamino-5(4)-thiazolone group which are useful as sensitizers for photographic silver halide emulsions.

The new merocyanine dyes of our invention can be represented by the following general formula:

I.

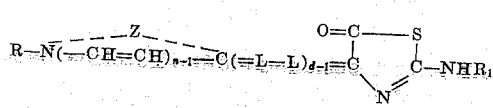

wherein R represents an alkyl group, such as methyl, ethyl, n-propyl, isopropyl, n-butyl, isobutyl, n-amyl, n-octyl, β-hydroxyethyl, β-chloroethyl, β-acetoxyethyl, etc. groups (especially alkyl groups of the formula $C_mH_{2m+1}$ wherein $m$ represents a positive integer of from 1 to 8), R represents the acyl group of a carboxylic acid, e. g., acetyl, propionyl, butyryl, isobutyryl, benzoyl, o-, m-, and p-toluoyl, etc., L represents a methine group (substituted and unsubstituted, e. g., =CH—, =CR'— where R' represents an alkyl group, such as methyl, ethyl, etc.), $n$ represents a positive integer from 1 to 2, $d$ represents a positive integer from 1 to 3, and Z represents the non-metallic atoms necessary to complete a heterocyclic nucleus, containing from 5 to 6 atoms in the heterocyclic ring, such as those selected from the group consisting of those of the thiazole series (e. g. thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.), those of the thionaphtheno-7', 6', 4,5-thiazole series (e. g. 4'-methoxythionaphtheno-7', 6', 4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.); those of the 3-isoquinoline series (e. g. isoquinoline, etc.), those of the 3,3-dialkylindolenine series (e. g. 3,3-dimethylindolenine, 3,3,5-trimethylindolenine, 3,3,7-trimethylindolenine, etc.), those of the pyridine series (e. g. pyridine, 5-methylpyridine, etc.), etc.

According to the process of our invention, we prepare the merocyanine dyes of Formula I above where $d$ is 2 or 3 by condensing a cyclammonium quaternary salt selected from those represented by the following general formula:

II.

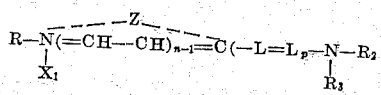

wherein R, L, Z, and $n$ have the values set forth above, $R_2$ represents a hydrogen atom, an alkyl group (e. g. methyl, ethyl, etc.), or the acyl group of a carboxylic acid (e. g. acetyl, propionyl, etc.), $R_3$ represents an aryl group (e. g. phenyl, o-, m-, and p-tolyl, etc.), or $R_2$ and $R_3$ together represent the non-metallic atoms necessary to complete a heterocyclic nucleus (e. g. a piperidyl, morpholinyl, etc. nucleus), $X_1$ represents an acid radical, e. g. $Cl^-$, $Br^-$, $I^-$, $SCN^-$, $ClO_4^-$, $C_2H_5SO_4^-$, $p\text{-}CH_3\text{-}C_6H_4\text{-}SO_3^-$, etc., and $p$ represents a positive integer from 1 to 2, with an acid-addition salt of a 2-acylamino-5(4)-thiazolone selected from those represented by the following general formula:

III.   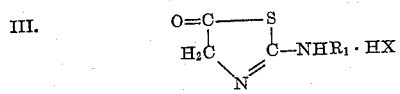

wherein $R_1$ has the values set forth above and $X$ represents an acid radical, e. g. chloride, bromide, acetate, etc. The condensations are advantageously carried out in the presence of an acid-binding agent, e. g. the trialkylamines, such as triethylamine, tri-n-butylamine, etc., dialkylanilines, such as N,N-dimethyl-, N,N-diethylanilines, etc., heterocyclic tertiary amines, such as pyridine, quinoline, N-alkylpiperidines, etc., alkali metal alcoholates, such as sodium ethylate, etc. The condensations can also be carried out in the presence of an inert diluent, such as methanol, ethanol, n-propanol, isopropanol, n-butanol, diethyl ether, acetone, 1,4-dioxane.

The merocyanine dyes of Formula I above where $d$ is 1 can be prepared by condensing a cyclammonium quaternary salt selected from those represented by the following general formula:

IV.   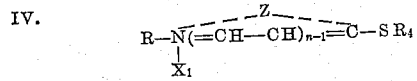

wherein $R$, $Z$, $X_1$, and $n$ have the values set forth above, and $R_4$ represents an alkyl group, such as methyl, ethyl, etc., or an aryl group, such as phenyl o-, m-, and p-tolyl, etc., with a 2-acylamino-5(4)-thiazolone acid-addition salt selected from those represented by Formula III above. The condensations can advantageously be carried out in the presence of an acid-binding agent, such as the trialkylamines (e. g. triethylamine, tri-n-butylamine, etc.), dialkylanilines (e. g. N,N-dimethyl-, N,N-diethylaniline, etc.), heterocyclic tertiary amines (e. g. pyridine, quinoline, N-alkyl-piperidines, etc.), alkali metal alcoholates (e. g. sodium methylate, sodium ethylate, etc.), etc. The condensations can also be carried out in the presence of an inert diluent, such as methanol, ethanol, n-propanol, isopropanol, n-butanol, isobutanol, diethyl ether, acetone, 1,4-dioxane, etc.

The following examples will serve to illustrate more fully the manner whereby we practice our invention.

*Example 1.—[2-(1-ethylquinoline)] [4-acetamino-5(4)-thiazolone] dimethinemerocyanine*

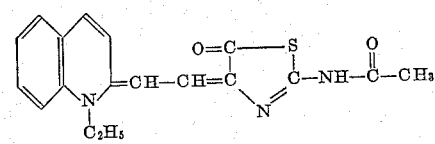

2.39 g. of 2-acetamino-5(4)-thiazolone hydrobromide and 4.44 g. of 2-β-acetanilidovinylquinoline ethiodide were dissolved in a mixture of 10 cc. of ethanol and 2.8 cc. of triethylamine. The solution was refluxed for 5 minutes, and the reaction mixture was chilled. The precipitate was collected on a filter and then dissolved in warm benzene. The benzene solution was cooled whereupon the desired dye was obtained as green crystals having a melting point of 233° C. It sensitized a gelatino-silver chloride emulsion to 660 mμ, with a maximum lying between 500 and 600 mμ. It sensitized a gelatino-silver bromiodide emulsion to 640 mμ.

*Example 2.—[4-(1-ethylquinoline)] [4-(2-acetamino-5(4)-thiazolone] dimethinemerocyanine*

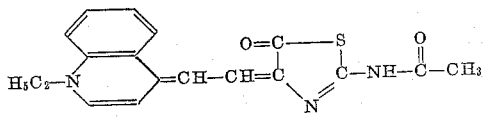

This dye was prepared in the same manner as the dye of Example 1 by replacing the 2-β-acetanilidovinylquinoline ethiodide by a molecularly equivalent amount of 4-β-acetanilidovinylquinoline ethiodide, and by recrystallizing the product dye from ethanol instead of benzene. It was obtained as a dark green powder melting at 226° C.

*Example 3.—[2-(3-ethylbenzoxazole)] [4-(2-acetamino-5(4)-thiazolone)] dimethinemerocyanine*

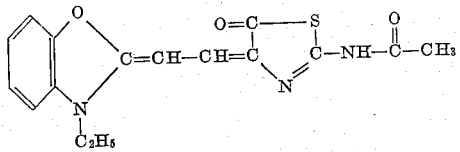

1.2 g. of 2-acetamino-5(4)-thiazolone hydrobromide and 2.2 g. of 2-β-acetanilidovinylbenzoxazole ethiodide were dissolved in a mixture of 5 cc. of ethanol and 1.4 cc. of triethylamine. The solution was refluxed for 5 minutes, and then chilled. The precipitate was collected on a filter and then dissolved in warm chloroform. The chloroform solution was cooled, whereupon the desired dye separated in the form of red needles with a bluish lustre having a melting point of 264° C. (turned orange about 135° C.). It sensitized a gelatino-silver chloride emulsion strongly to 600 mμ, with maxima at 450 and 520 mμ. It sensitized a gelatino-silver bromiodide emulsion to 560° mμ with a maximum at 530 mμ.

*Example 4.—[2-(3-methylthiazoline)] [4-(2-acetamino-5(4)-thiazolone)] dimethinemerocyanine*

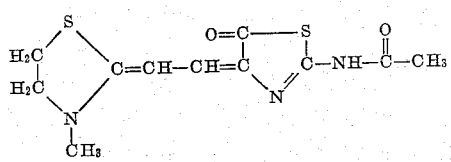

This dye was prepared in the same manner as the dye of Example 1 by replacing the 2-acetanilidovinylquinoline ethiodide with a molecularly equivalent amount of 2-β-acetanilovinylthiazoline methiodide, and by recrystallizing the product dye from pyridine instead of benzene. It was obtained as an orange powder melting at 276° C. It sensitized a gelatino-silver chloride emulsion with a maximum at 500 mμ and a gelatino-silver bromiodide emulsion with a maximum at 520 mμ.

*Example 5.* — [2-(3-ethylbenzothiazole)] [4-(2-acetamino-5-(4)-thiazolone] dimethinemerocyanine

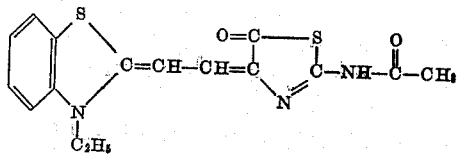

1.2 g. of 2-acetamino-5(4)-thiazolone hydrobromide and 2.35 g. of 2-β-acetanilidovinylbenzothiazole ethiodide were dissolved in a mixture of 5 cc. of ethanol and 1.4 cc. of triethylamine. The solution was refluxed for 5 minutes and then chilled. The precipitate was collected on a filter and then dissolved in a benzene-ethanol mixture. The solution was cooled, and the desired dye separated as greenish-brown needles having a melting point of 228° C. It sensitized a gelatino-silver chloride emulsion to 640 mμ with maxima at 480 and 550 mμ. It sensitized a gelatino-silver bromiodide emulsion to 640 mμ.

*Example 6.* — [2-(3-ethylthiazoline)] [4-(2-acetamino-5(4)-thiazolone] dimethinemerocyanine

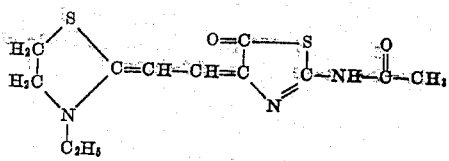

1.2 g. of 2-acetamino-5(4)-thiazolone hydrobromide and 2.0 g. of 2-β-acetanilidovinylthiazoline ethiodide were dissolved in a mixture of 5 cc. of ethanol and 1.4 cc. of triethylamine. The solution was refluxed for 5 minutes, and then chilled. The precipitate was dissolved in a benzene-ethanol solution, and then cooled. The desired dye separated as orange crystals melting at 264° C. (orange-red at 136° C.). It sensitized a gelatino-silver chloride emulsion with a maximum at 500 mμ.

*Example 7.* — [2-(3-ethylbenzoselenazole)] [4-(2-acetamino-5(4)-thiazolone] dimethinemerocyanine

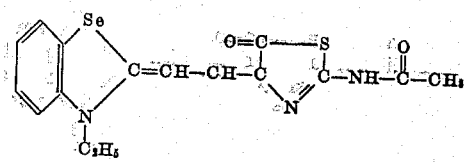

1.2 g. of 2-acetamino-5(4)-thiazolone hydrobromide and 2.5 g. of 2-β-acetanilidovinylbenzoselenazole ethiodide were dissolved in a mixture of 10 cc. of ethanol and 1.4 cc. of triethylamine. The solution was refluxed for 5 minutes and then chilled. The precipitate was collected on a filter and then dissolved in warm chloroform. The chloroform solution was chilled, whereupon the desired dye separated as glittering green crystals having a melting point of 239° C. It sensitized both a gelatino-silver chloride emulsion and a gelatino-silver bromiodide emulsion with a flat maximum lying between 500 and 550 mμ.

*Example 8.* — [2-(3-methylbenzothiazole)] [4-(2-acetamino-5(4)-thiazolone)] merocyanine

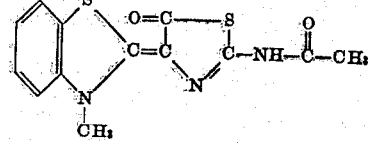

3.7 g. of 2-methylthiobenzothiazole metho-p-toluenesulfonate (2 - methylmercaptobenzothiazole metho-p-toluenesulfonate), 2.4 g. of 2-acetamino-5(4)-thiazolone hydrobromide, 20 cc. of ethanol, and 3 cc. of triethylamine were refluxed together for 10 minutes. The reaction mixture was chilled and the precipitate collected on a filter. The precipitate was dissolved in warm pyridine, and the solution chilled. The desired dye separated as glistening yellow prisms having a melting point above 320° C.

*Example 9.* — [2-(3-ethylbenzoxazole)] [4-(2-n-butyramino-5(4)-thiazolone] tetramethinemerocyanine

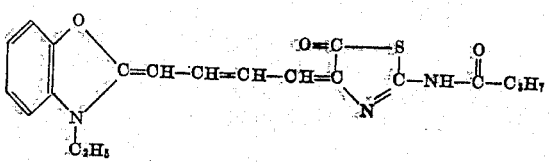

1.15 g. of 2-(δ-acetanilido)-1,3-butadienylbenzoxazole ethiodide, 0.7 g. of 2-n-butyramino-5(4)-thiazolone hydrobromide, 15 cc. of ethanol, and 0.8 cc. of triethylamine were refluxed together for 3 minutes. The reaction mixture was then cooled and the precipitate collected on a filter. The precipitate was dissolved in warm methanol, and the solution chilled. The desired dye was obtained as glossy, dark, purple platelets having a melting point of 191° C. It sensitized a gelatino-silver chloride emulsion with a maximum at 630 mμ.

*Example 10.* — [2-(3-ethylbenzoxazole)] [4-(2-benzamino-5(4)-thiazolone] dimethinemerocyanine

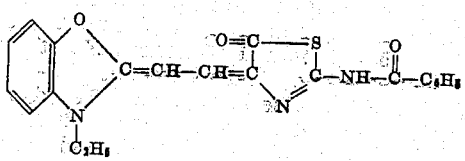

This dye was prepared in the same manner as the dye of Example 3 by replacing the 2-acetamino-5(4)-thiazolone hydrobromide by a molecularly equivalent amount of 2-benzamino-5(4)-thiazolone hydrobromide, and by recrystallizing the product dye from warm ethanol instead of chloroform. It was obtained as brick red needles having a melting point of 262° C. It sensitized a gelatino-silver chloride emulsion with a maximum at 500 mμ and a gelatino-silver bromiodide emulsion with a maximum at 530 mμ.

*Example 11.* — [2-(3-methylthiazoline)] [4-(2-benzamino-5(4)-thiazolone)] dimethine-merocyanine

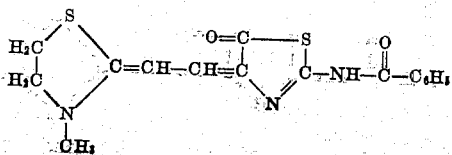

This dye was prepared in the same manner as the dye of Example 6 by replacing the 2-β-acetanilidovinylthiazoline ethiodide with a molecularly equivalent amount of 2-β-acetanilidovinylthiazoline methiodide, and the 2-acetamino-5(4)-thiazolone hydrobromide by a molecularly equivalent amount of 2-benzamino-5(4)-thiazolone hydrobromide, and also by recrystallizing the product dye from ethanol instead of a benzene-ethanol mixture. It was obtained as orange needles having a melting point of 242° C. It sensitized a gelatino-silver chloride emulsion with a maximum at 500 mμ and a gelatino-silver bromiodide emulsion with a maximum at 520 mμ.

*Example 12.—[2-(3-ethylbenzoxazole)] [4-(2-n-butyramino - 5(4) - thiazolone)] dimethine-merocyanine*

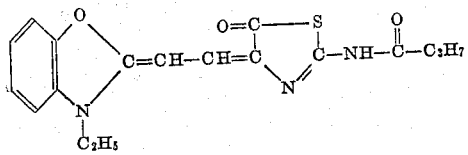

This dye was prepared in the same manner as the dye of Example 3 by replacing the 2-acetamino - 5(4) - thiazolone hydrobromide by a molecularly equivalent amount of 2 - n - butyramino-5(4)-thiazolone hydrobromide, and by recrystallizing the product dye from ethanol instead of chloroform. It was obtained as brick red needles having a melting point of 212° C. It sensitized a gelatino-silver chloride emulsion with a maximum at 510° C. and a gelatino-silver bromiodide emulsion with a maximum at 530 mμ.

*Example 13.—[2-(3-methylthiazoline)] [4-(2-butyramino - 5(4) - thiazolone)] dimethine-merocyanine*

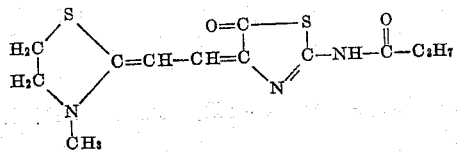

This dye was prepared in the same manner as the dye of Example 9 by replacing the 2-(δ-acetanilido)-1,3-butadienylbenzoxazole ethiodide by a molecularly equivalent amount of 2-β-acetanilidovinylthiazoline methiodide. The dye was obtained as orange prisms having a melting point of 229° C. It sensitized a gelatino-silver chloride emulsion with a maximum at 500 mμ.

The 2-acylamino-5(4)-thiazolone acid addition salts used in the above examples were obtained as follows:

*Example 14.—2-acetamino-5(4)-thiazolone hydrobromide*

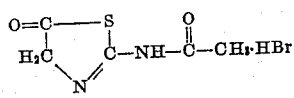

8.8 g. of acetylthiohydantoic acid (Wheeler et al.—"Amer. Chem. Jour.", vol. 46 (1911), pg. 469) were dissolved in 45 cc. of anhydrous dioxane and 30 cc. of diethyl ether, and 10 cc. of phosphorous tribromide were added. The solution was shaken gently and then stirred manually for several minutes until the whole solidified. The solid was shaken with diethyl ether, and the ether then decanted off. There was obtained a 95 percent yield of the desired intermediate having a melting point of 159° C. It fumed strongly in moist air, but remained stable when stored in a desiccator.

*Example 15.—2-benzamino-5(4)-thiazolone hydrobromide*

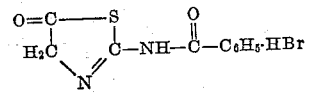

7.5 g. of N-benzoylthiohydantoic acid (Wheeler et al., loc. cit.) were triturated and then suspended in a mixture of 50 cc. of dioxane and 125 cc. of diethyl ether, and 4 cc. of phophorus tribromide were added. The stoppered flask was shaken mechanically for 30 minutes and then allowed to stand for 3 hours. The thick precipitate which formed was collected on a filter. After washing with diethyl ether, 9.0 g. (95 percent yield) of a cream powder having a melting point of 190° C. (prior darkening) was obtained.

*Example 16.—2-n-butyramino-5(4)-thiazolone hydrobromide*

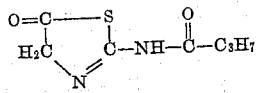

25.0 g. of ethyl dithiocarbamate and 36 cc. of n-butyric anhydride were heated together at 120° C. for 4 hours. The reaction product was recrystallized from warm methanol to give yellow needles melting at 45° C. The ethyl N-n-butyryldithiocarbamate thus obtained had the formula:

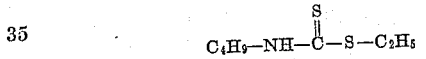

25.0 g. of the ester obtained above were refluxed with a solution of 7.5 g. of potassium hydroxide and 10 g. of glycine in 30 cc. of water and 38 cc. of ethanol for 8 hours. The solution was then concentrated and acidified by the method of Wheeler et al., loc. cit. There were thus obtained 16.0 g. of cream needles having a melting point of 180° C. from aqueous ethanol. The N-n-butyrylthiohydantoic acid thus obtained had the formula:

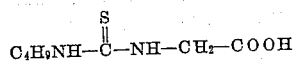

5.1 g. of the N-n-butyrylthiohydantoic acid obtained above were suspended in a mixture of 25 cc. of dioxane and 75 cc. of diethyl ether, and 4.0 cc. of phosphorus tribromide were added. After shaking the reaction mixture for several minutes, it was allowed to stand. The product obtained was washed with diethyl ether and dried. It was in the form of a colorless powder (94 percent yield) and had a melting point of 220° C. This product was the desired 2-n-butyramino-5(4)-thiazolone hydrobromide.

By replacing the n-butyric anhydride in the above example by other acid anhydrides, e. g. propionic, isobutyric, o-, m-, and p-toluic, etc. anhydrides, other 2-acylamino-5(4)-thiazolones can be obtained.

We have found that our new dyes spectrally sensitize photographic silver halide emulsions when incorporated therein. The dyes are especially useful for extending the spectral sensitivity of the customarily employed gelatino-silver-chloride, gelatino-silver-chlorobromide, gelatino-silver-bromide and gelatino-silver-bromiodide developing-out emulsions. In the foregoing examples, the extent to which gelatino-silver bromiodide developing-out emulsions can be sensitized as well as the point of maximum sensitivity are pointed out in connection with the dye of each example. To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol or acetone has proved satisfactory as a solvent for most of our new dyes. Where the dyes are quite insoluble in methyl alcohol, a mixture of acetone and pyridine is advantageously employed as a solvent. The dyes are advantageously incorporated in the finished, washed emulsions and should be uniformly distributed throughout the emulsions. The particular solvent used will, of course, depend on the solubility properties of the particular dye.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our new dyes, the following procedure is satisfactory:

A quantity of dye is dissolved in methyl alcohol or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

What we claim and desire secured by Letters Patent of the United States is:

1. A merocyanine dye selected from those represented by the following general formula:

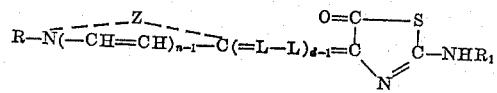

wherein R represents an alkyl group containing from 1 to 8 carbon atoms, $R_1$ represents the acyl group of a carboxylic acid, L represents a methine group, $n$ represents a positive integer from 1 to 2, $d$ represents a positive integer from 1 to 3, and Z represents the non-metallic atoms necessary to complete a heterocyclic nucleus selected from the group consisting of those of the thiazole series, those of the benzothiazole series, those of the naphthothiazole series, those of the thionaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the 3,3-dialkylindolenine series, and those of the pryidine series.

2. The merocyanine dye represented by the following formula:

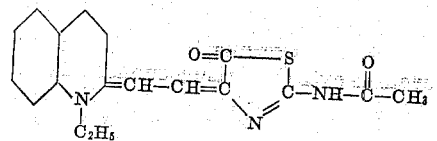

3. The merocyanine dye represented by the following formula:

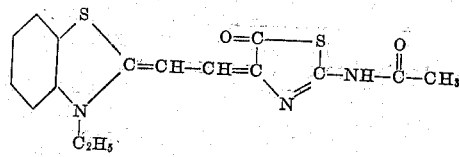

4. The merocyanine dye represented by the following formula:

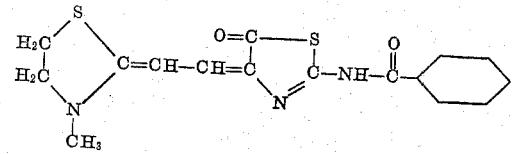

5. The merocyanine dye represented by the following formula:

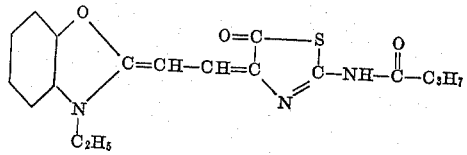

6. The merocyanine dye represented by the following formula:

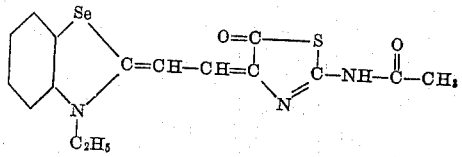

7. A method for making merocyanine dyes comprising condensing an acid-addition salt of a 2-acylamino-5(4)-thiazolone selected from those represented by the following general formula:

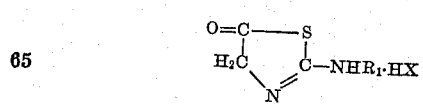

wherein $R_1$ represents an acyl group of a carboxylic acid an X represents an acid radical with a cyclammonium quaternary salt selected from those represented by the following general formula:

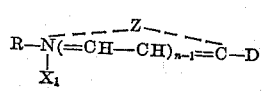

wherein R represents an alkyl group, $X_1$ represents an acid radical, $n$ represents a positive integer of from 1 to 2, Z represents the non-metallic atoms necessary to complete a heterocyclic nucleus containing from 5 to 6 atoms in the heterocyclic ring, and D represents a member selected from the group consisting of an alkylmercapto group, an arylmercapto group, a β-arylaminovinyl group, and a δ-arylamino-1,3-butadienyl group.

8. A method according to claim 7 for making merocyanine dyes comprising condensing an acid-addition salt of a 2-acylamino-5(4)-thiazolone with a 2-β-acetanilidovinylquinoline alkyl salt wherein the alkyl group is an alkyl group of the formula $C_mH_{2m+1}$ wherein $m$ represents a positive integer of from 1 to 8.

9. A method according to claim 7 for making merocyanine dyes comprising condensing an acid-addition salt of a 2-acylamino-5(4)-thiazolone with a 2-β-acetanilidovinylbenzothiazole alkyl salt wherein the alkyl group is an alkyl group of the formula $C_mH_{2m+1}$ wherein $m$ represents a positive integer of from 1 to 8.

10. A method according to claim 7 for making merocyanine dyes comprising condensing an acid-addition salt of a 2-acylamino-5(4)-thiazolone with a 2-β-acetanilidovinylthiazoline alkyl salt wherein the alkyl group is an alkyl group of the formula $C_mH_{2m+1}$ wherein $m$ represents a positive integer of from 1 to 8.

11. A method according to claim 7 for making merocyanine dyes comprising condensing an acid-addition salt of a 2-acylamino-5(4)-thiazolone with a 2-β-acetanilidovinylbenzoxazole alkyl salt wherein the alkyl group is an alkyl group of the formula $C_mH_{2m+1}$ wherein $m$ is a positive integer of from 1 to 8.

12. A method according to claim 7 for making merocyanine dyes comprising condensing an acid-addition salt of a 2-acylamino-5(4)-thiazolone with a 2-β-acetanilidovinylbenzoselenazole alkyl salt wherein the alkyl group is an alkyl group of the formula $C_mH_{2m+1}$ wherein $m$ represents a positive integer of from 1 to 8.

PER AUBERT.
EDWARD B. KNOTT.

References Cited in the file of this patent

UNITED STATES PATENTS

| Number | Name | Date |
|---|---|---|
| 2,078,233 | Brooker | Apr. 27, 1937 |
| 2,170,804 | Brooker | Apr. 27, 1937 |
| 2,177,402 | Brooker | Oct. 24, 1939 |

OTHER REFERENCES

Cook et al., J. Chem. Soc. (1949), pp. 2342–2346.
Cook, J. Chem. Soc. (1948), pp. 1056 and 1057.
Cook, J. Chem. Soc. (1949), pp. 1435–1437.